(No Model.)
J. FOLEY.
WATER CLOSET.
No. 272,539. Patented Feb. 20, 1883.
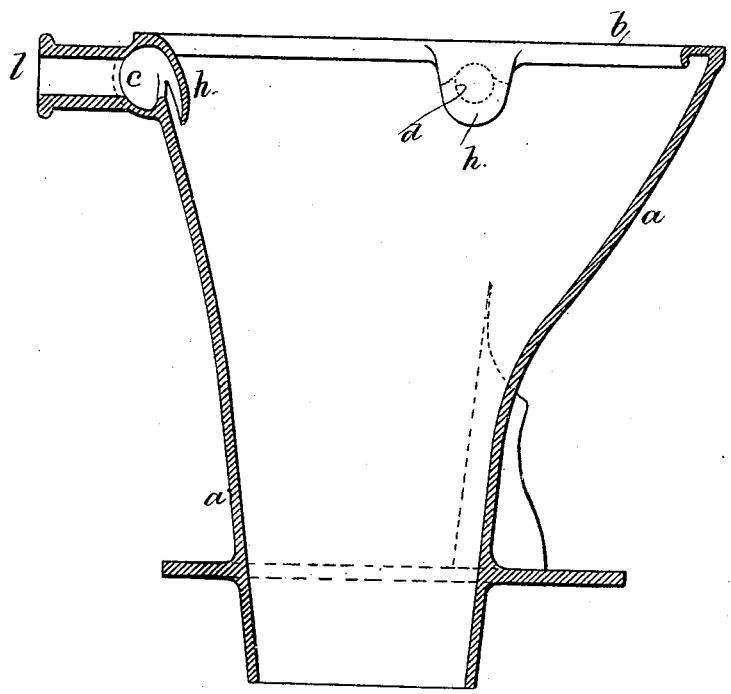
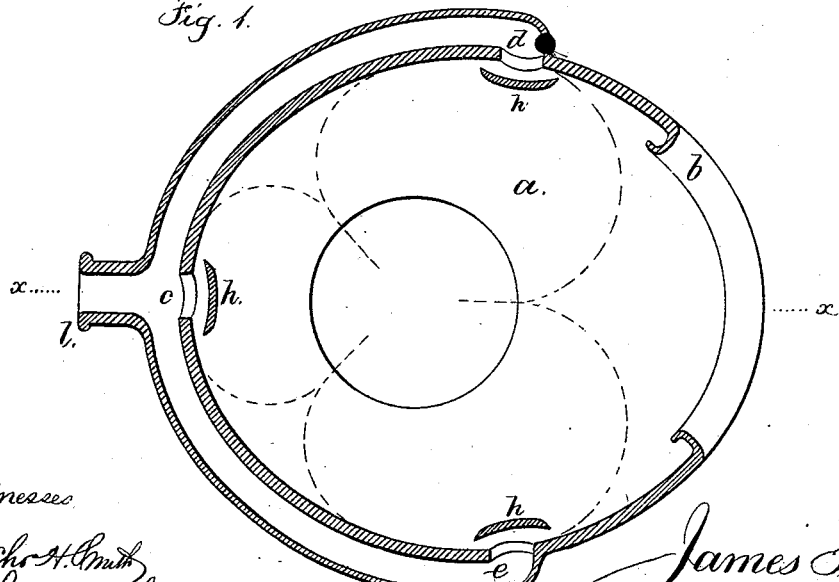
Witnesses
Chs. H. Smith
Harold Serrell
Inventor
James Foley
per Lemuel W. Serrell
atty

UNITED STATES PATENT OFFICE.

JAMES FOLEY, OF BROOKLYN, NEW YORK, ASSIGNOR TO FREDERICK ADEE, OF SAME PLACE.

WATER-CLOSET.

SPECIFICATION forming part of Letters Patent No. 272,539, dated February 20, 1883.

Application filed October 2, 1882. (No model.)

*To all whom it may concern:*

Be it known that I, JAMES FOLEY, of Brooklyn, in the county of Kings and State of New York, have invented an Improvement in Water-Closets, of which the following is a specification.

Water-closets have been made with a fan or deflector at the end of the supply water-pipe to spread the water upon the inner surface of the basin or hopper, and in some instances a hollow rim has been used, into which the water is supplied and runs upon the inner surface of the basin through either slots or perforations.

My invention is for spreading the water upon the entire inside of the basin, and for creating impinging currents that cause the water to rise from the surface of the basin and fall into the center of the escape or sewer pipe or trap and carry down any floating substances—such as paper—and thereby insure a more rapid cleansing of the trap. I make use of two or more (preferably three) water-supply openings into the basin and a spreader or fan to each, so that the water, issuing in thin strata at three places, forms three impinging currents, and when these currents meet at an inclination to each other there is a dash of water rising from the inner surface of the basin, which acts the same as a central wash to carry away any floating substance from the trap in the sewer-pipe.

In the drawings, Figure 1 is a plan, partially in section, representing the directions in which the water is spread within the basin, and Fig. 2 a vertical section at $x\ x$.

The water-closet is made with a basin, hopper, or bowl, $a$, the shape of which may be conical, hemispherical, or conoidal, and of any desired character.

At or near the rim $b$, surrounding the top of the basin, there are two or three water-supply pipes, $c\ d\ e$, (I have shown three,) and there is a spreader or fan, $h$, at the end of each of the water-supply pipes. These water-supply pipes are to be either lead pipes, branching out from one main supply and entering horns or hollow hubs on the porcelain or iron basin, or else they are formed by a tubular rim, as shown, which extends part of the way around the hopper at the upper end, and to which tubular rim the main supply water-pipe is attached at $l$.

Each spreader may be of sheet metal, or it may be made in the porcelain, in any of the well-known forms.

The water as it issues from behind the fans is spread upon the interior surface of the basin or hopper, and the currents of water impinge against each other as they flow downwardly, and as these currents are of equal strength, or nearly so, they cannot continue in their opposing courses, but they are thrown inwardly, as indicated in Fig. 1, and, leaving the surface of the basin or hopper, the water pours in streams or jets down into the middle of the escape or sewer pipe, cleansing the same thoroughly.

It is also to be understood that part of the water continues to flow down the interior of the hopper or basin and inside the soil-pipe, so as to wash the surface thoroughly.

I claim as my invention—

The combination, with a water-closet hopper or basin provided with two or more supply-openings, each connected with the water-supply, of a spreader applied to each opening, whereby the water is spread and the impingement of opposite currents produces a rise of water that falls in the middle of the escape pipe or opening, in the manner and for the purposes set forth.

Signed by me this 28th day of September, A. D. 1882.

JAMES FOLEY.

Witnesses:
GEO. T. PINCKNEY,
HAROLD SERRELL.